United States Patent
Carbou et al.

(10) Patent No.: US 11,526,574 B2
(45) Date of Patent: Dec. 13, 2022

(54) SERVER OF STATISTICS FOR OPTIMIZATION OF CLIENT-SERVER REQUESTS

(71) Applicant: ORANGE, Issy-les-Moulineaux (FR)

(72) Inventors: Romain Carbou, Brunoy (FR); Thomas Op, Arcueil (FR); Stephen Roze, Issy les Moulineaux (FR)

(73) Assignee: ORANGE, Issy-les-Moulineaux (FR)

( * ) Notice: Subject to any disclaimer, the term of this patent is extended or adjusted under 35 U.S.C. 154(b) by 241 days.

(21) Appl. No.: 16/313,274

(22) PCT Filed: Jun. 22, 2017

(86) PCT No.: PCT/FR2017/051667
§ 371 (c)(1),
(2) Date: Dec. 26, 2018

(87) PCT Pub. No.: WO2018/002483
PCT Pub. Date: Jan. 4, 2018

(65) Prior Publication Data
US 2019/0155867 A1    May 23, 2019

(30) Foreign Application Priority Data
Jun. 27, 2016 (FR) ...................................... 1655947

(51) Int. Cl.
*G06F 16/957* (2019.01)
*H04L 67/01* (2022.01)
(Continued)

(52) U.S. Cl.
CPC .......... *G06F 16/9574* (2019.01); *G06F 9/451* (2018.02); *G06F 16/954* (2019.01);
(Continued)

(58) Field of Classification Search
CPC .... G06F 16/9574; G06F 9/451; G06F 16/954; H04L 41/20; H04L 67/42
See application file for complete search history.

(56) References Cited

U.S. PATENT DOCUMENTS

| | | |
|---|---|---|
| 2012/0291045 A1 | 11/2012 | Martin |
| 2013/0159383 A1* | 6/2013 | Tuliani ................ H04L 67/2842 709/203 |

(Continued)

FOREIGN PATENT DOCUMENTS

WO    2015041711 A1    3/2015

OTHER PUBLICATIONS

English Translation of Written Opinion of the International Searching Authority dated Sep. 1, 2017 for corresponding International Application No. PCT/FR2017/051667, filed Jun. 22, 2017.
(Continued)

*Primary Examiner* — Andrew C Georgandellis
(74) *Attorney, Agent, or Firm* — David D. Brush; Westman, Champlin & Koehler, P.A.

(57) ABSTRACT

A method for executing a client application on a client terminal communicating with a server application on a server via a telecommunications network. The client application includes at least two views, at least one view being configured to establish at least one request to the server application. According to the method, the client application is associated with a data structure relating to the views of the application, in which at least one parametrization attribute of the request is associated with a view. The method includes the following steps on the client application: selecting a view, termed a current view; obtaining of an attribute associated with the current view in the data structure relating to the views of the application; and generating a request to the server application.

15 Claims, 3 Drawing Sheets

(51) Int. Cl.
  *G06F 9/451* (2018.01)
  *G06F 16/954* (2019.01)
  *H04L 41/00* (2022.01)
(52) U.S. Cl.
  CPC ............ *G06F 16/957* (2019.01); *H04L 41/20* (2013.01); *H04L 67/01* (2022.05)

(56) References Cited

U.S. PATENT DOCUMENTS

2015/0156280 A1* 6/2015 Vaswani ................. H04L 67/42
  709/203
2015/0371142 A1* 12/2015 Jain ........................ G06N 5/048
  706/52

OTHER PUBLICATIONS

Fielding. "Dissertation . . . Chapter 5: Representational State Transfer (REST)". 2000.
International Search Report dated Aug. 28, 2017 for corresponding International Application No. PCT/FR2017/051667, filed Jun. 22, 2017.
Written Opinion of the International Searching Authority dated Aug. 28, 2017 for corresponding International Application No. PCT/FR2017/051667, filed Jun. 22, 2017.

* cited by examiner

SERVER OF STATISTICS FOR OPTIMIZATION OF CLIENT-SERVER REQUESTS

CROSS-REFERENCE TO RELATED APPLICATIONS

This Application is a Section 371 National Stage Application of International Application No. PCT/FR2017/051667, filed Jun. 22, 2017, which is incorporated by reference in its entirety and published as WO 2018/002483 A1 on Jan. 4, 2018, not in English.

TECHNICAL FIELD

The invention pertains to software applications in the context of client-server applications.

The invention applies in particular to the optimization of the requests between a client and its server.

PRIOR ART

Applications built on the client-server model allow the user of a terminal, the so-called client terminal, access to resources on a server situated remotely in a communications network. An application, the so-called server application, offers a set of services to the applications of the client terminals, the so-called client applications.

In the context of an application executing on a mobile terminal, such applications may be for example applications for accessing a personal account of mobile, banking, medical data, a weather service, etc. If one takes the example of a banking application, these services may pertain to the making available of information relating to a current account or a savings account of the user, the management of bank payments, access to the user's banking details, access to the bank's details, access to a banking simulator, etc.

To benefit from these services, the user generally navigates around various pages of the client application, each page being liable to send one or more requests to one or more services of the server application. This navigation is also called a "client pathway". The server replies to the requests through a reply comprising data which enable a result to be displayed on the client terminal. These data may be interface data for display and/or data specific to the application (for example, the balance of the current account, the latest operations performed on the account, etc.)

These requests can be sent to the server according to various modes: the client application can send the request in an anticipated manner, demanding an immediate reply from the server, or on the contrary send a request only when display is required, without any guarantee as to when the reply is received. The request mode chosen generally results from a compromise between the fluidity of display guaranteed to the user, the nature of the manipulated data and the dimensioning of the server (that is to say the number of requests that it can receive and process simultaneously). Today, most applications manage their request modes in a static manner: some of the requests are anticipated when booting the application, the others being sent when the user navigates around the various pages, or views, of the application.

However, a certain mode may be desirable for the request as a function of its relative importance with respect to the others: certain requests are more frequent than others, require a faster reply, etc. For example, within the framework of the banking application mentioned above, the user probably asks for data relating to his current account more often than for a bank loan simulation. According to another example, at certain periods, like the end of the month, users may be more concerned with the "forthcoming operations" page in order to check the scheduling of the payment of their salary.

Moreover, the most suitable mode of request may frequently change during the life of an application: the client pathways within the application evolve, part of the application may gain or lose in relative importance, etc.

Taking these changes into account involves significant application-related maintenance costs since a modification of the modes of requests to the various services assumes an updating of the application by the developers, and then a reloading of the application onto the user's terminal, etc.

The invention affords a solution not exhibiting the drawbacks of the prior art.

THE INVENTION

To this effect, according to a functional aspect, the subject of the invention is a method for executing a client application on a client terminal communicating with a server application on a server via a telecommunications network, said client application comprising at least two views able, at least one view being configured to establish at least one request to the server application, characterized in that the client application is associated with a data structure relating to the views of the application, in which at least one parametrization attribute of the request is associated with a view, and in that the method comprises the following steps on the client application:

selection of a view, termed the current view;
   obtaining of an attribute of the current view in the data structure relating to the views of the application;
   generation of a request to the server application, said request being parametrized as a function of the attribute obtained.

The term "view" designates the presentation of data corresponding to zero, one or more resources made available by the server and that can be displayed on the screen of the client terminal. One will also speak of "page" in the context of a Web application.

The term "client terminal" designates in a general manner any computing device able to dispatch requests to a server so that the latter dispatches back to it in return the data which are the object of the request, for example, in the context of a Web application, a page identified in the request by its address on the server.

The term "telecommunication network" designates in a general manner any communication means allowing the remote exchange of data between a server and a client terminal; it may be a local area network (LAN) such as the intranet of a company or else a long distance network (WAN) such as for example the Internet network, or else a set of networks of different and interconnected types.

The term parametrization "attribute" of the request designates an item of data relating to a view of the application, which is also a characteristic of the request which will be sent to the server.

The term "data structure relating to the views of the application" designates a data structure which makes it possible to define a pathway through the views of the application ("client pathway"), with a certain number of attributes associated with each view and/or with the services associated therewith. Hereinafter, one speaks of graph, but it would also be possible to envisage this structure in the form of lists, arrays, etc. Passage, or navigation, from one view to another is determined by a link.

Advantageously according to the invention, the data relating to the views of the application condition the requests to the server, since the request is parametrized as a function of an attribute obtained via this data structure. In particular, the moment of sending of the request and the mode of retrieval of the data received in reply can be thus parametrized. This structure therefore determines the behaviour of the client application. It is however independent of the client application and can be stored elsewhere. It is thus possible to modify the characteristics of the requests to the server, without changing the application itself. Stated otherwise, the invention separates the data relating to the views of the application, from the application itself. It therefore affords the advantage of not requiring any reprogramming of the application when a characteristic attached to a request has to be modified. This avoids reprogramming the application and making it available (for example at a store), and therefore entails a gain in terms of development. This also involves advantages for the user: he experiences greater fluidity in navigation if the requests are adapted to his behaviour, and he need reupdate the applications less often on his terminal. Finally, at the level of the terminal, intelligent management of the requests sent by the application may make it possible to optimize the resources. The invention therefore improves application-related maintenance in the broad sense, including, in particular, optimization, management of the resources of the client application and/or of the client terminal, comfort of the user of the terminal, etc.

According to a particular mode of implementation of the invention, in a method such as described hereinabove, a view is linked to at least one other view by a navigation link for browsing the data structure, and the method is furthermore characterized in that it comprises the following steps:
  obtaining, in the data structure relating to the views of the application, of at least one second attribute for at least one second view distinct from the current view and linked to the current view by at least one navigation link;
  generation of a request to the server as a function of the second attribute obtained.

Advantageously, this mode of implementation of the invention makes it possible to generate to the server requests associated with a view which is not necessarily the current view: if another view of the data structure requires a particular mode of request, for example in an anticipated manner, obtaining this attribute makes it possible to generate the request even though the user has not yet accessed the view (navigated onto the view). This will make it possible in particular to place important data in cache while waiting for the user to actually navigate onto this view (page).

This mode of implementation of the invention makes it possible in particular to generate to the server requests associated with a "parent" view of the current view, that is to say linked to the current view by a direct link: obtaining this attribute makes it possible to generate the request even though the user has not yet accessed the view but is approaching it by navigating in the application. This will make it possible in particular to place in cache important data of the page following the current page, which has a high probability of being consulted after the current page.

This mode of implementation of the invention also makes it possible to generate to the server requests associated with a view which is linked to the current view by a set of links, that is to say a navigation "path" for browsing the data structure linked to the views: obtaining this attribute makes it possible to generate the request even though the linked view is fairly distant from the current view (in the navigation sense) but exhibits particular interest or particular importance. This will make it possible in particular to place in cache important data of any page of the application.

According to a second particular mode of implementation of the invention, which will be able to be implemented alternatively or cumulatively with the previous mode, a method such as described hereinabove is furthermore characterized in that the data structure relating to the views of the application is obtained from the server.

Advantageously according to this embodiment, the data relating to the views of the application are obtained by the client terminal originating from the server. Stated otherwise, the client application receives from the server, in the course of a session or outside of a session, the way in which each type of request will be performed during the navigation around the client application. This is advantageous since the server knows not only the usage statistics for the terminal on which the method is executing, but also on the other terminals. It can therefore generate a particularly relevant data structure.

According to a variant of this second particular mode of implementation of the invention, a method such as described hereinabove is furthermore characterized in that the data structure relating to the views of the application is obtained in reply to a request for connection of the client application to the server application.

Advantageously according to this variant, the data relating to the views of the application are obtained by the client terminal at each start of communication session between the client and the server. The client terminal can thus analyse the data structure received right from the start of the client-server exchange.

According to a third particular mode of implementation of the invention, which will be able to be implemented alternatively or cumulatively with the previous modes, a method such as described hereinabove is furthermore characterized in that a request parametrization attribute associated with the view is a request policy attribute.

Advantageously according to this embodiment, the attribute associated with the view is a policy attribute of the request, that is to say an attribute which conditions the instant of sending of the request with respect to the instant of navigation onto the view, as well as the instant of receipt of the data.

According to a fourth particular mode of implementation of the invention, which will be able to be implemented alternatively or cumulatively with the previous modes, a method such as described hereinabove is furthermore characterized in that a request parametrization attribute associated with the view is a priority attribute.

Advantageously according to this embodiment, the attribute associated with the view is a priority attribute associated with the view (or with a service of the view), that is to say an attribute which conditions the importance of the view (or of a service of the view) with respect to the others, and therefore makes it possible to send a request to the server while taking this priority into account: a higher priority view will be able for example to serve as the basis for a request which is parametrized in such a way as to obtain the data of the server faster than a lower priority view.

According to a fifth particular mode of implementation of the invention, which will be able to be implemented alternatively or cumulatively with the previous modes, in a method such as described hereinabove, at least one service of the server is associated with a view in the data structure, and the method is furthermore characterized in that a parametrization attribute of the request is associated with said service.

Advantageously according to this embodiment, the attribute is associated, not with the global view, but more specifically with a service dependent on a view (or associated with a view). In this way, one and the same view can request services with requests of different types, as a function for example of the relative importance of the service in the view, or data that it manipulates, etc.

According to a sixth particular mode of implementation of the invention, which will be able to be implemented alternatively or cumulatively with the previous modes, a method such as described hereinabove is furthermore characterized in that the data structure relating to the views of the application comprises an oriented graph.

Advantageously according to this embodiment, the oriented graph makes it possible to describe naturally the navigation between the views, since such a graph uses oriented links to pass from one view to the other, the nodes of the graph being associated with the various views.

According to a seventh particular mode of implementation of the invention, which will be able to be implemented alternatively or cumulatively with the previous modes, a method such as described hereinabove is furthermore characterized in that it comprises:
 a step of collecting the usage data;
 a step of transmitting the usage data to the server.

Advantageously according to this embodiment, the usage data (time spent on a page, services requested, navigation from page to page, etc.) are collected and transmitted to the server which can thus reupdate its usage statistics for the terminal on which the method is executing or more generally for a set of terminals.

According to another functional aspect, the invention also relates to a method for managing a data structure relating to the views of a the application, said structure comprising at least two views, characterized in that the management method comprises the following steps:
 obtaining of a data structure relating to the views of the application, at least one view comprising in the data structure at least the following data associated with the view:
  a service;
  a parametrization attribute of a request to said service;
  a navigation link for navigating to another view;
 reception of the usage data associated with the view;
 updating, as a function of the usage data received, of at least one item of data associated with the view in the data structure.
 transmission of the updated data structure.

Advantageously, the reception of the usage data allows the method according to this aspect of the invention to reupdate the data structure (graph, table, etc.) which makes it possible to personalize the behaviour of the application. As a function of the usage data collected on one or more terminals, the invention advantageously makes it possible to change the application-related links (therefore the possibilities of navigating from one view to another), the attributes associated with the views (therefore the modes of requests to the server as a function of the view and/or of the service concerned).

According to a hardware aspect, the invention also relates to a communication terminal hosting a client application communicating with a server application on a server via a telecommunications network, said client application comprising at least two views, at least one view being configured to establish at least one request to the server application, the client application being associated with a data structure relating to the views of the application, in which at least one parametrization attribute of the request is associated with a view and the terminal comprises the following modules:
 a selection module for selecting a view, termed the current view;
 an obtaining module for obtaining an attribute associated with the current view in the data structure relating to the views of the application;
 a generation module for generating a request to the server application, said request being parametrized as a function of the attribute obtained.

According to another hardware aspect, the invention also relates to a device for managing a data structure relating to the views of a the application, said structure comprising at least two views, characterized in that the management device comprises the following modules:
 an obtaining module for obtaining a data structure relating to the views of the application, at least one view comprising in the data structure at least the following data associated with the view:
  a service;
  a parametrization attribute of a request to said service;
  a navigation link for navigating to another view.
 a receiving module for receiving the usage data associated with the view;
 an updating module for updating, as a function of the usage data received, at least one item of data associated with the view in the data structure.
 a communication module for communicating the updated data structure.

According to yet another hardware aspect, the invention also relates to a system for managing a client-server application, the system comprising:
 at least one terminal such as described previously;
 a server comprising a management device such as described previously, configured to collect the usage data originating from at least one terminal.

According to another hardware aspect, the invention also relates to a computer program able to be implemented in a terminal such as defined previously, the program comprising code instructions which, when the program is executed by a processor, carries out the steps of the execution method.

According to another hardware aspect, the invention also relates to a computer program able to be implemented in a management device such as defined previously, the program comprising code instructions which, when the program is executed by a processor, carries out the steps of the management method.

The objects according to the hardware aspects of the invention procure at least the same advantages as those procured by the methods.

These programs may use any programming language, and be in the form of source code, object code, or of code intermediate between source code and object code, such as in a partially compiled form, or in any other desirable form.

According to yet another hardware aspect, the invention deals with a recording medium readable by a data processor on which is recorded a program comprising program code instructions for the execution of the steps of the methods defined hereinabove.

The information medium may be any entity or device capable of storing the program. For example, the medium may comprise a storage means, such as a ROM, for example a CD ROM or a microelectronic circuit ROM, or else a magnetic recording means, for example a diskette (floppy disk) or a hard disk. Moreover, the information medium may be a transmissible medium such as an electrical or optical signal, which may be conveyed via an electrical or optical cable, by radio or by other means. The program according to the invention may in particular be downloaded over a network of Internet type. Alternatively, the information medium may be an integrated circuit in which the program is incorporated, the circuit being adapted to execute or to be used in the execution of the method in question.

The invention will be better understood on reading the description which follows, given by way of example and with reference to the appended drawings.

DETAILED DESCRIPTION OF AN EXEMPLARY EMBODIMENT ILLUSTRATING THE INVENTION

Figure 1:
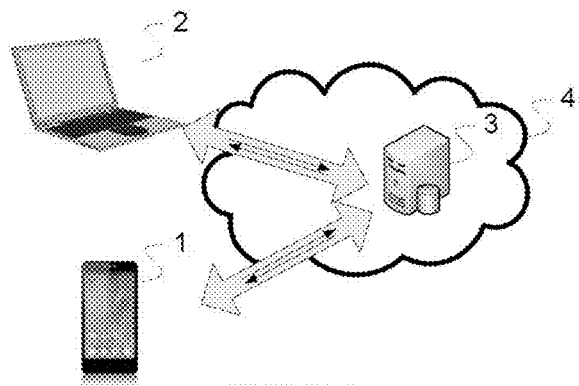
FIG. 1 represents a client/server system according to the prior art.

FIG. 1 represents a client/server system according to the prior art. It will however be noted that the invention applies more broadly to distributed applications, that is to say whose data may originate from several servers.

Such a system comprises at least one applications server (3) whose role is to provide a certain number of services (for example banking) to users of client terminals.

Two clients (1,2) are according to this example a smartphone (1) and a portable personal computer (PC) (2) which are able to dialogue with the server (3) so as to obtain data relating to the application. To this effect, an application, the so-called client application, has been installed on the client terminal. No limitation is attached to the type of terminal, or to the type of application. It may, according to this example, entail an Android application on the smartphone client, and a Windows application on the PC, the two applications offering the same functionalities, for example banking functionalities, according to derivatives (display, navigation, etc.) which may be different. It will be noted that two identical versions of an application addressed at two different operating systems (for example IOS and Android for a smartphone) may have different needs, the clients of the two types of associated terminals not necessarily adopting the same type of navigation in one and the same application. The invention applies without loss of generalities to such a case.

In such a system, the client application asks the server for a resource in the form of request (R) via a telecommunications network (4), and the server provides it with the resource in a reply. The client is equipped with a user interface, or MMI (Machine Man Interface), tasked with the presentation of the data relating to the resource and interaction with the user. According to this example, the client is a Web browser and communicates with the application server via the HTTP (HyperText Transfer Protocol) or HTTPS protocol on a network of Internet type (4). The server, also of Web type, transmits Web pages requested by the client. Any other type of network, protocol, client software and/or server could be envisaged without departing from the scope of the invention.

Conventionally, the exchange starts with connection of the client application to the server application, followed by an initial resource request (in this instance, a Web page). The Web server replies by returning said initial page to the client, for example the welcome page corresponding to the banking application. The client's Web browser displays the page on the client terminal. The user can then interact with the application in navigating from page to page and by inputting data (account number, password, etc.) which are transmitted to the server via the telecommunications network.

As mentioned beforehand, the requests can be sent to the server according to various modes: in an anticipated manner, that is to say before the display of the data, "just-in-time", that is to say at the instant which precedes that at which display thereof is required, or according to some other rule which may be for example "at the latest a page before the required page", with if relevant the display of a message asking the user to please wait until the reply is obtained, etc. Hereinafter, the choice of this mode is called the "policy" of the request and attached to an attribute termed the "policy attribute". It therefore conditions the instant of sending of the request with respect to the instant of navigation onto the view, as well as the instant of receipt of the data. This attribute can be influenced by several factors, in particular the importance of the data attached to the resource, but also of the user's navigation pathway, called the "client pathway", or else the dimensioning of the server. According to the known prior art, usage data, in particular counters of visits to each part of the application, are collected by the server. Their analysis, partially or fully automated, makes it possible to glean statistical trends relating to the application and which may be used by developers to fine tune the various modes of requests within the application. For example, a rarely visited page may load its data at the last moment (in "just in time" mode) and thus unburden the other processings which are more frequent, more important, etc. However, these statistics may change during the life of the application: the pathways of the clients within the application are modified, part of the application may gain or lose in relative importance, etc.

This results in significant application-related maintenance costs since modifying the request modes entails the developers updating the application, and then the user reloading or updating the application, etc.

Figure 2:
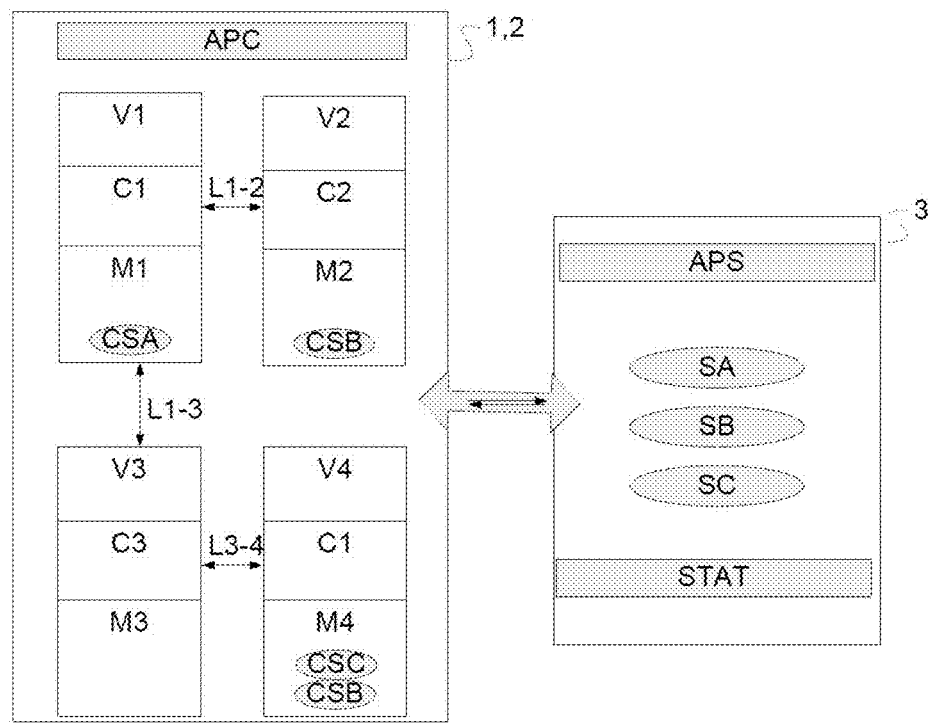
FIG. 2 illustrates an architecture of a client-server system according to the prior art.

FIG. 2 illustrates an architecture of a client-server system according to the prior art.

Such a model, of MVC (Model-View-Controller Design Pattern in English) type, is given by way of example and could be replaced without loss of generality by any other appropriate model known to the person skilled in the art. This model (MVC), well known to the person skilled in the art, is intended to meet the needs of interactive applications by separating the problems linked with the various software components. The idea underlying such an architecture is in particular to properly separate the data, the presentation and the processings:

The model (M) corresponds to the data of the application.

The View (V) is a user interface which presents the data of the model and transmits the user's actions to the controller.

The Controller (C) updates the view or the model as a function of the user's requests and synchronizes them.

Thus the Web client represented in FIG. 2 comprises an application APC (Client Application) comprising four views V1 to V4, each of the views being associated with a model M1 to M4 under control of the controllers C1 to C4. These components have for example been downloaded with the application (APC) on the client terminal (1,2). In the context of the example, each of the views can be traditionally regarded as a Web page. Each view allows access to one or more services denoted CS (Client Service) corresponding to services denoted SA, SB and SC on the server (3). According to our example:

View 1 corresponds to the home page of the banking application; it comprises an application-related module "CSA" of the client application which is able to establish requests to the corresponding service SA of the server application; hereinafter, this module is called a "dependency" of the application.

View 2 corresponds to the payments page; it comprises a module "CSB";

View 3 corresponds to a parametrization page for displaying the date and time, it does not require any information on the part of the server and does not therefore comprise any dependency;

View 4 pertains to consultations of accounts (it allows in particular according to this example the consultation of payment of salary, and is therefore frequently invoked at the end of the month) and comprises two modules "CSC" and "CSB").

A service (SA-SC) can be a resource on the server, accessible according to a particular request. For example, in the context of a REST architecture (a de facto standard, described in the thesis by Fielding (with reference: "*Roy Thomas Fielding. 2000. Dissertation . . . CHAPTER 5: Representational State Transfer (REST)*"), proposing a representation of the transfer of data with the aid of everyday conventional "verbs" of the HTTP standard, a service can correspond to an HTTP request type (also called a "verb") such as a "GET" request (which makes it possible to retrieve the content of a resource identified by an address of URL type) or a POST request (which makes it possible to dispatch data to a URL so as to create a new resource). By "resource" is meant here a data set, independently of its presentation. According to our example, the resource may be for example the list of the latest operations performed on the user's current account, which list will be able to be displayed in the form of a Web page on the user's client terminal.

It is possible to pass from one view to another, by navigating in particular from page to page via the application's graphical interface. These transitions are symbolized by the links Li-j where i represents the origin view and j the arrival view when passing from view i to view j.

The set of components MVC is controlled by the application APC dialoguing with the application APS of the server, which offers the services SA, SB and SC.

In this type of model according to the prior art, a server side application, denoted STAT, is tasked with collecting the various usage data relating to the views of the application on the various clients and with compiling statistics pertaining to the application (number of visits to each view, links used between the views, etc.). Their analysis can subsequently be partially or fully automated. It allows the designers and developers of the application to upgrade it. However, this upgrading is expensive since each new development generally involves a new delivery on an applications server (for example a server of Android, or Apple, etc. applications) and an updating of the application on each of the client terminals.

Figure 3:
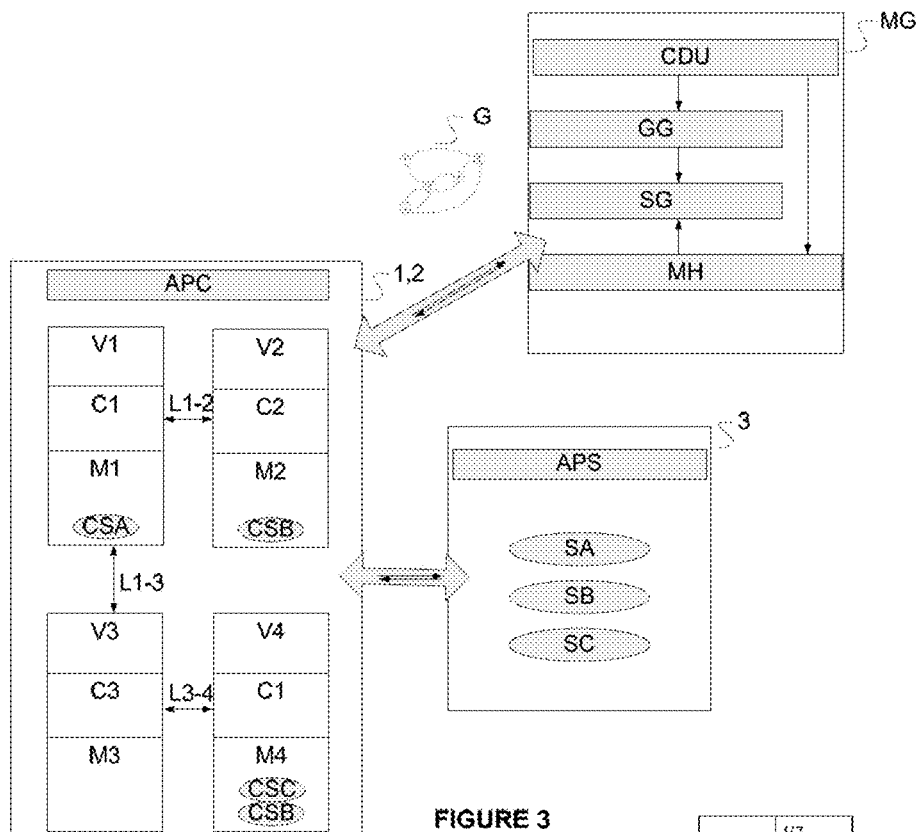
FIG. 3 illustrates the architecture of a client-server system according to one embodiment of the invention.

FIG. 3 illustrates the architecture of a client-server system according to one embodiment of the invention. It relies on the use of a new module/device denoted MG (for Graphs Manager) which makes it possible to collect the data relating to the views and to organize them in graph form. This module is preferably situated on the server, but it may alternatively be situated anywhere in the network, in a centralized or distributed manner.

It is recalled that the main advantage of the invention is to reduce the cost of maintaining the applications since the statistics obtained and optionally updated through the collecting of usage data are used automatically by the system to modify the attributes of the requests to the server, without however requiring a redevelopment of the application.

The various sub-modules of the module MG are entitled:

CDU: Collection of Usage Data. This module is connected with the various views and receives the data which are pertinent thereto (for example, each time a user navigates onto view 2, a view counter V2 is incremented; each time a user selects a service (SB) on the view, a service/view counter is incremented, etc.)

GG: Graph Generator. This is the module in charge of dynamically generating the graph, as a function of a previous state and of the data collected by the module CDU.

SG: Graph Server. This is the module in charge of the exchanges of graphs between the module MG and the client application (APC).

MH: Heuristic Engine. This is a module which makes it possible, by means of statistical knowledge and techniques within the reach of the person skilled in the art, to reupdate the graph of the application automatically and/or manually.

The manner of operation of these various modules will be detailed hereinafter in support of FIG. 5.

Figure 4:
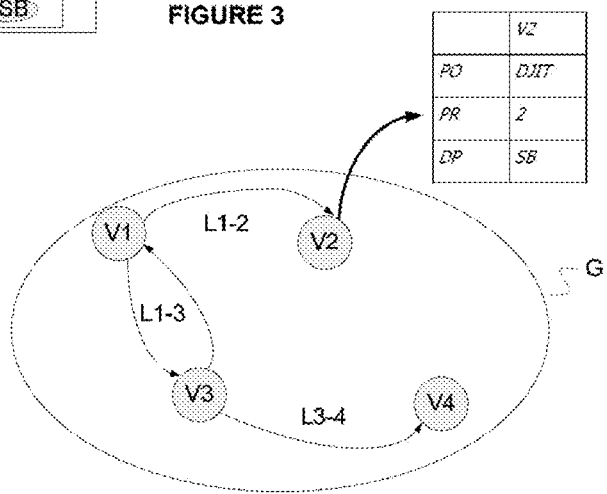
FIG. 4 illustrates a graph according to one embodiment of the invention.

FIG. 4 illustrates a graph (G) according to one embodiment of the invention.

Any other type of representation of the data relating to the views of the application can be envisaged.

The set of navigations that the user can make from one application-related view (V1-V4) to the other constitutes the graph (G) of the application. The nodes of G are the views properly speaking, and a link denoted L1-2 from a view "V1" to a view "V2" conveys the possibility of navigating from V1 to V2. An oriented graph is considered here, that is to say the links may be unidirectional (it is possible to navigate from a source view to a target view in a non-reversible manner) or bidirectional, that is to say it is possible in the latter case to navigate in both directions. In practice, in the context of a mobile application, the links are often bidirectional.

A given view can have one or more services (SA-SC) of the remote server as dependency. Each node of the graph therefore comprises a certain number of associated dependencies (D), a dependency being a module (CSA-CSC) able to dialogue with the corresponding module of the server. A view might also possibly not possess any dependency.

Moreover a view of the graph comprises a certain number of attributes. In this embodiment of the invention, each view of the graph (G) is the bearer of at the minimum two attributes:

a) Applicable Policies (PO)

As introduced previously, the "policy" attribute (PO) is an attribute qualifying the policy of resolution of the dependencies to the service (dubbed "Policy" hereinafter), that is to say the mode of request to the server when this service is called. A few possible examples of values for this attribute are listed hereinbelow:

getDataAsEarlyAsPossible (DAEP): the services on which the view depends are resolved as soon as possible and if relevant placed in cache (for example because the server's reply is lengthy and the view is consulted frequently);

getDataAsEarlyAsPossibleWithPriorityThreshold (DAEPWP): the services on which the view depends are resolved as soon as possible and if relevant placed in cache if the view has a priority above a certain threshold;

getDataInParentView (DIPV): the services on which the view depends are invoked during navigation in any "parent" view in the Graph of the application (i.e. any view i allowing navigation to the view j concerned via a link Li-j);

getDataInParentViewWithPriorityThreshold (DIPVWPT): the services on which the view depends are invoked during navigation in any parent view if the view has additionally a priority above a certain threshold;

getDataJustInTime (DJIT): the services on which the view depends are invoked only when loading the view (for example because the view is rarely consulted and/or the services reply rapidly and/or the user can tolerate waiting for the reply).

It will be noted that these policies can be combined with criteria in respect of expiry of the data returned by the services of the server.

It will also be noted that the above list is given by way of indication and could be supplemented with any policy intended to modify the mode of request to the server.

B) Priorities (PR)

A second attribute according to this example, dubbed "PRiority" (PR), qualifies the relative importance of the view with respect to the other views. In order to manage this attribute, a method of the application makes it possible to compare the respective priority levels of the various views. The priority of each view may be for example an algebraic value (normalized or not), a boolean value, a vector with several components, etc.

The table T1 presented as annexe proposes a representation making it possible, in addition to or in replacement for the graph (in this second case, the links must be added to it), to present the attributes and dependencies of the application; according to one embodiment of the invention, shown diagrammatically in FIG. 4, this table is stored in memory accessible by the client application, in addition to the graph. Thus, in FIG. 4, the node corresponding to the view 2 (V2) is associated (by a pointer, an indirection, a list, etc.) with the column of the table T1 which makes it possible, while navigating, to retrieve the dependencies of the view and the associated priorities. According to this example, the view V2 is associated with the service SB (fourth row), it possesses a first attribute (PO, second row) of type getDataJustInTime (DJIT) and a second priority attribute (PR, third row) of value 2. It will be noted that the two attributes (PO, PR) according to this example are associated with the view itself.

According to a variant presented with table 2 T2 presented as annexe, the two attributes (PO, PR) are associated with a service of the view (a dependency). Thus the view 4, on which the services SB and SC depend, has according to this variant two values per attribute: the attributes associated with the service SB have value DJIT (PO) and 2 (PR), whilst the attributes associated with the service SC have value DAEP (PO) and 3 (PR).

It goes without saying that if the client application does not receive any graph (because for example, the service is unavailable) or receives a poorly formatted/incoherent graph, it will know to disregard it and implement a "default" requests policy.

Figure 5:
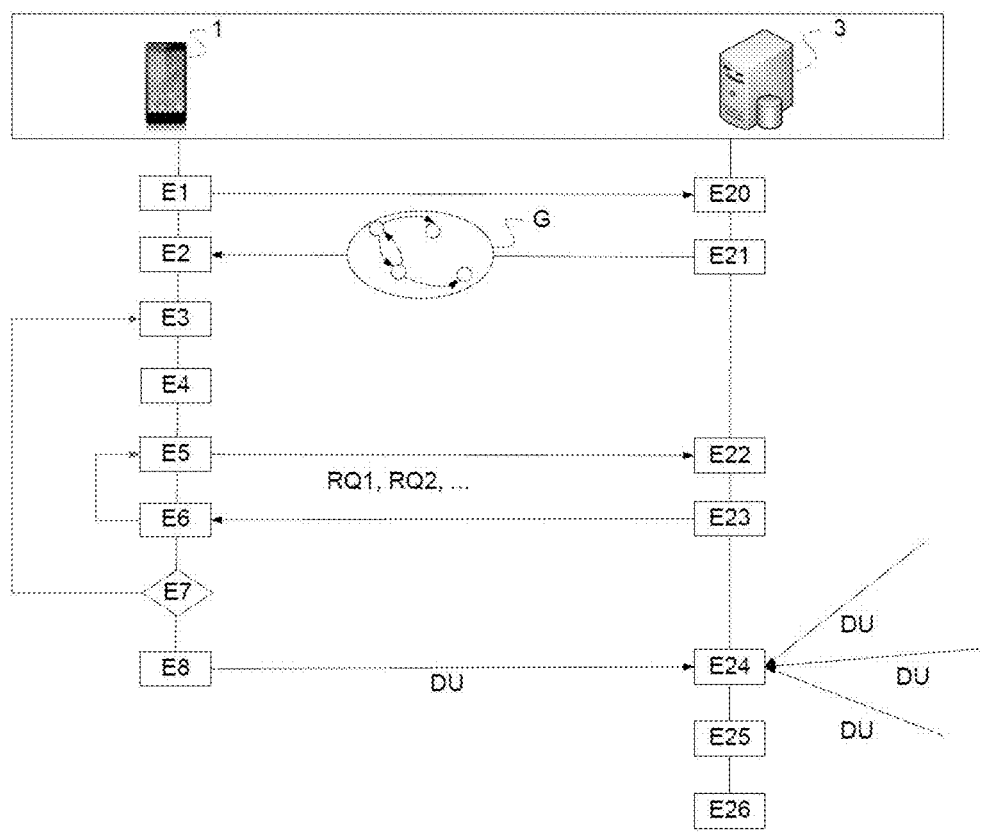
FIG. 5 represents a flowchart illustrating the various steps of a method according to one embodiment of the invention.

FIG. 5 represents a flowchart illustrating the various steps of a method according to one embodiment of the invention. In this embodiment, the server transmits, at the start of the session, the graph G to the client application, accompanied by the dependencies table (T1, T2) described in support of FIG. 4. Hereinafter, we shall speak only of "graph" for the sake of simplification. It is recalled that any other type of representation of the data relating to the views of the application, describing a set of mutually linked views, and with which are associated attributes and dependencies, making it possible to influence the sent requests destined for the applications of the server, can however be envisaged.

This graph is preferably used thereafter for the entire duration of the communication session between the server and the client. However, as will be seen hereinafter, the graph of the application may be reupdated regularly and a new graph can be proposed during a following session.

During a step E1, a request is sent from the client to the server so as to obtain the graph of the application. This request corresponds, according to this example, to the initialization of a communication session with the server. The graph may be asked for implicitly or explicitly; it will moreover be noted that this step and the following one are optional since the client application may keep a "default" graph locally, and this may be beneficial for example in case the corresponding function of the server is momentarily unavailable.

During a corresponding step E20, the server receives the request and replies through the transmission of the graph G which is stored by the client terminal during a step E2, with a view to its utilization by the client application.

During a step E3, the client "navigates" onto a view, that is to say the user of the terminal (1) selects according to our example a page of the banking Web application. This view is called "current view" hereinafter. It is for example the view V1 of FIG. 3.

During the loading of the current view, the client application evaluates during step E4, by virtue of the graph:

on the one hand, the policy attached to this view (typically if it is a getDataJustInTime policy, it could not, by its very nature, be processed upstream);

on the other hand, all the policies of other views of the graph, fulfilling certain criteria; for example, if there exists at least one view of the graph applying the getDataAsEarlyAsPossibe policy or if a "daughter" view of the current view applies the getDataInParentView policy, it is necessary to prepare the requests in advance for said views, even before the user navigates over.

During a step E5 the corresponding services are requested, in an asynchronous manner. The corresponding requests are denoted RQ1, RQ2, etc. Each request corresponds to a service of a view, or more generally to a view. It will be noted that one is dealing here with requesting not only services dependent on the current view, but also all the services dependent on views part of the graph and for which the request must be sent before actually navigating onto this page.

During a corresponding step E22, the server executes the requests corresponding to the requested services and replies to the requests of the client application in the course of step E23.

It will be noted that certain mechanisms well known to the person skilled in the art are not described here, for example in the case where the user navigates rapidly from one view to another, it is known to implement certain protection mechanisms to avoid so-called "burst" requests of one and the same service whilst a first request for this service is already on standby pending reply.

In the course of the corresponding step E6, the client application receives the results of its diverse requests and acts appropriately: caching of the data, processing, transmission of the data to the views of the application, etc.

Steps E5 and E6 are repeated until all the necessary requests to the services have been processed.

During a following step E7, the client can navigate onto another view. If this is the case, we return to step E3, the new view becomes the current view and steps E4 to E6 are repeated. During these steps, the client application records the usage data relating to each action of the user.

When the client has finished navigating, the client application provides during a step E8 the usage data (DU) to the server part. Mention may for example be made, in a nonexhaustive manner, of the following events, associated with the requested statistics:
- event of entry to each view (time-stamping and identifier of view);
- event of exit from each view (time-stamping and identifier of view);
- event of call of a service (time-stamping and identifier of service in the view);
- event of reply of a service (time-stamping and identifier of service in the view).
- event of navigation from one view to another view (time-stamping and identifier of the link).
- etc.

According to an exemplary implementation, the usage statistics comprise data triplets denoted (Si, Ti, Vi) corresponding to a user session Si, a time-stamping Ti and a view identifier Vi. The processing of these triplets, in tandem with their acquisition, can serve to construct the graph, gradually. For example, if the triplet (S1, t0, V0) is straight away followed by (S1, t1, V1) (with t1>t0 and without any intermediate value between t0 and t1), it is reasonable to deduce that the user associated with the session "S1" has navigated from the view V0 to the view V1 and to adapt the statistics of the link L0-1 accordingly. This information can moreover be weighted by counters totaling up the number of cases encountered, all users included, so as to enhance the reliability of the relevance of the Link L0-1 (between the view V0 and the view V1).

It will be noted that this step can be performed regularly throughout the session.

During a corresponding step E24, the server application receives the usage data via its module CDU. As symbolized by the incoming arrows, it collects and aggregates the usage data arising from diverse client applications that are active at this instant (if relevant, it retransmits all or part of these data, in their initial form or in the form of aggregates, to a third-party server).

Step E24 is followed by a step E25. In the course of this step, the graph G is updated as a function of the data received in the previous step. According to this mode, the graph is therefore constructed and/or updated on the fly by the server by virtue of the collection and consolidation of the statistics of frequenting of each view.

Finally, during an optional step E26, the server application reupdates the policies of the graph of the application by means of heuristics and of statistical techniques, automated and/or manual, known to the person skilled in the art. According to an example, the results are produced on the basis of aggregates (the consolidated usage data originating from the set of client applications) and by complying with a sufficiently spaced frequency (typically, at least 24 hours between two executions), on the basis of working assumptions. It is an intelligent assessment of these assumptions which then allows judicious updating of the graph. According to case, this phase may be wholly or partly automated if the criteria are reliable and deterministic.

According to a concrete example, an analyst (human or software) detects that the client pathways which string together the chain View 1→View 2→View 3 pass very rapidly over view 2 (which is, as it were, "transient").
- According to a first assumption, view 2 is actually only a transient menu. This page is perhaps to be deleted in the future.
- According to a second assumption, view 2 contains an item of information over which the user will pass very rapidly (for example, a question of the type "have I exceeded my fixed rate allowance: YES/NO?" or: "what is my current balance?" elicits a reply which is very rapidly analysed by the user, even though this is a very important item of information.
- According to a third assumption, the item of information is important but poorly featured (hidden "at the bottom" of the page for example). This makes it possible to detect (and subsequently correct) a problem of ergonomics of the application.
- According to a fourth assumption, the item of information is clearly visible but irrelevant. It therefore involves a time loss for the user, a visual nuisance, etc.
- Etc.

The trade-off between these diverse interpretations may moreover involve complementary quantities such as the amount of information present on the view.

It will be noted that this step E26 may be carried out regularly by the server application, independently of the other previous or following steps. Its behaviour (including the use of third-party techniques and data) and the frequency of its activity are liable to vary over time.

It goes without saying that the embodiment which has been described hereinabove has been given purely by way of wholly nonlimiting indication, and that numerous modifications may be easily made by the person skilled in the art without, however, departing from the scope of the invention.

In particular, according to a variant, it is conceivable that the graph can be refreshed in during a session.

Moreover, according to the embodiment described hereinabove, the graph liable to be delivered at a given instant is the same for all the users. The attributes of the views change over time but in a uniform manner for the whole set of users. However, according to a first variant embodiment, it would be possible to envisage delivering different graphs to the various client terminals. The users are in this case grouped together by common profiles: for example, the users of one and the same profile have in common that they most often frequent the same view; or that they spend a comparable time on such a part of the graph; etc. There is in this case, at a given instant, a type of graph per user profile, the profiles remaining limited in number, considerably fewer than the number of users. According to yet another variant, the graph is entirely customized. Each client application is therefore liable to have at a given instant a processing of the graph, and therefore modes of requests to the server, which is specific to it. This embodiment allows total adaptation of the client application to its user's browsing habits. These three variant embodiments may finally be compounded according to, for example, procedures termed "A/B testing" (one part of the client applications obeys one of these sub-modes, the other part obeys another sub-mode); random procedures; or any other procedure known to the person skilled in the art. By way of example, it would be possible to imagine that 90% of the client applications obey the main embodiment and that 10% of client applications obey the second variant ("customized"), this so as to measure over these 10% of users any possible changes of behaviours in the client experience.

Annexe

TABLE 1

(T1): attributes and dependencies of the views of an application

|    | V1   | V2   | V3 | V4     |
|----|------|------|----|--------|
| PO | DAEP | DJIT | —  | DJIT   |
| PR | 1    | 2    | —  | 2      |
| DP | SA   | SB   | —  | SB, SC |

TABLE 2

(T2): attributes and dependencies of the views of an application - variant

|    | V1   | V2   | V3 | V4         |
|----|------|------|----|------------|
| PO | DAEP | DJIT |    | DJIT, DAEP |
| PR | 1    | 2    |    | 2, 3       |
| DP | SA   | SB   | —  | SB, SC     |

The invention claimed is:

1. A terminal comprising:
a processor; and
a non-transitory computer readable medium comprising instructions of a client application stored thereon, the client application being hosted by the terminal and comprising a plurality of pages, the client application, when executed by the processor configure the terminal to perform acts comprising:
communicating, by the client application, with a server application on a server via a telecommunications network,
obtaining, from the server, by the client application, a data structure associated with the client application, the data structure comprising:
a navigation pathway from an identifier of a first page to an identifier of a second page of the client application, the navigation pathway conveying a possibility for the second page to be requested, via a graphical user interface of the client application, from the first page; and
a priority attribute and a policy attribute corresponding to the second page, said priority attribute conditioning how fast the terminal will receive a response of the server to a request for the second page, and the policy attribute conditioning an instant of sending to the server the request for the second page with respect to an instant of navigation onto the first page;
receiving, by the client application, a request for the first page of the client application via the graphical user interface of the client application;
obtaining, in response to the client application receiving the request for the first page, from the data structure, the priority attribute and the policy attribute corresponding to the second page based on the navigation pathway from the identifier of the first page to the identifier of the second page; and
sending, based on the obtained policy attribute, a request for the second page to the server application prior to the client application receiving a request for the second page via the graphical user interface of the client application, the request being parametrized as a function of the obtained priority attribute.

2. The terminal according to claim 1, wherein the data structure associated with the client application is obtained in reply to a request for connection of the client application to the server application.

3. The terminal according to claim 1, wherein the data structure comprises an attribute of the first page associated with at least one service of the server application associated with the first page.

4. The terminal according to claim 1, wherein the instructions furthermore configure the terminal to:
collect usage data relating to at least one of the client application pages; and
transmitting the usage data to the server.

5. The terminal according to claim 1, wherein the data structure associated with the client application comprises an oriented graph.

6. A method, implemented by a client application that is executing on a terminal of a telecommunications network, the client application communicating with a server application on a server via the telecommunications network, the client application comprising a plurality of pages, the method comprising:
obtaining, from the server, by the client application, a data structure associated with the client application the data structure comprising:
a navigation pathway from an identifier of a first page to an identifier of a second page of the client application, the navigation pathway conveying a possibility for the second page to be requested, via a graphical user interface of the client application, from the first page; and
a priority attribute and a policy attribute corresponding to the second page, said priority attribute conditioning how fast the terminal will receive a response of the server to a request for the second page, and the policy attribute conditioning an instant of sending to the server the request for the second page with respect to an instant of navigation onto the first page;
receiving, by the client application, a request for the first page of the client application via the graphical user interface of the client application;
obtaining, in response to the client application receiving the request for the first page, from the data structure, the priority attribute and the policy attribute corresponding to the second page based on the navigation pathway from the identifier of the first page to the identifier of the second page; and
sending, based on the obtained policy attribute, a request for the second page to the server application prior to the client application receiving a request for the second page via the graphical user interface of the client application, the request being parametrized as a function of the obtained priority attribute.

7. The method according to claim 6, wherein the data structure associated with the client application is obtained in reply to a request for connection of the client application to the server application.

8. The method according to claim 6, wherein the data structure associated with the client application comprises an oriented graph.

9. The method according to claim 6, wherein the data structure comprises an attribute of the first page associated with at least one service of the server application associated with the first page.

10. The method according to claim 6, wherein the method furthermore comprises:
- the terminal collecting usage data relating to at least one of the client application pages; and
- the terminal transmitting the usage data to the server.

11. A non-transitory computer readable medium comprising a computer program stored thereon, able to be implemented by a client application executing on a terminal of a telecommunications network, the client application communicating with a server application on a server via the telecommunications network, the client application comprising a plurality of pages, the program comprising code instructions which, when executed by a processor, carries out a method comprising:
- obtaining, from the server, by the client application, a data structure associated with the client application, the data structure comprising:
  - a navigation pathway from an identifier of a first page to an identifier of a second page of the client application, the navigation pathway conveying a possibility for the second page to be requested, via a graphical user interface of the client application, from the first page; and
  - a priority attribute and a policy attribute corresponding to the second page, said priority attribute conditioning how fast the terminal will receive a response of the server to a request for the second page, and the policy attribute conditioning an instant of sending to the server the request for the second page with respect to an instant of navigation onto the first page;
- receiving, by the client application, a request for the first page of the client application via the graphical user interface of the client application;
- obtaining, in response to the client application receiving the request for the first page, from the data structure, the priority attribute and the policy attribute corresponding to the second page based on the navigation pathway from the identifier of the first page to the identifier of the second page; and
- sending, based on the obtained policy attribute, a request for the second page to the server application prior to the client application receiving a request for the second page via the graphical user interface of the client application, the request being parametrized as a function of the obtained priority attribute.

12. The non-transitory computer readable medium according to claim 11, wherein the method furthermore comprises:
- collecting usage data relating to at least one of the client application pages; and
- transmitting the usage data to the server.

13. The non-transitory computer readable medium according to claim 11, wherein the data structure associated with the client application comprises an oriented graph.

14. The non-transitory computer readable medium according to claim 11, wherein the data structure associated with the client application is obtained in reply to a request for connection of the client application to the server application.

15. The non-transitory computer readable medium according to claim 11, wherein the data structure comprises an attribute of the first page associated with at least one service of the server application associated with the first page.

* * * * *